US010253648B2

(12) United States Patent
Bentley et al.

(10) Patent No.: US 10,253,648 B2
(45) Date of Patent: Apr. 9, 2019

(54) MODULATED HYBRID VARIABLE AREA TURBINE NOZZLE FOR GAS TURBINE ENGINE

(71) Applicant: General Electric Company, Schenectady, NY (US)

(72) Inventors: David Todd Bentley, Lebanon, OH (US); Christopher Ryan Johnson, Fairfield, OH (US); Brandon Flowers Powell, Mason, OH (US)

(73) Assignee: General Electric Company, Schenectady, NY (US)

( * ) Notice: Subject to any disclaimer, the term of this patent is extended or adjusted under 35 U.S.C. 154(b) by 369 days.

(21) Appl. No.: 15/060,876

(22) Filed: Mar. 4, 2016

(65) Prior Publication Data

US 2017/0254215 A1  Sep. 7, 2017

(51) Int. Cl.
F01D 9/04    (2006.01)
F01D 17/08   (2006.01)
F01D 17/16   (2006.01)

(52) U.S. Cl.
CPC ........... *F01D 17/162* (2013.01); *F01D 9/041* (2013.01); *F01D 17/085* (2013.01); *F05D 2220/32* (2013.01); *F05D 2240/122* (2013.01); *F05D 2240/124* (2013.01); *F05D 2240/128* (2013.01); *F05D 2270/303* (2013.01); *F05D 2270/66* (2013.01); *Y02T 50/673* (2013.01)

(58) Field of Classification Search
CPC . F01D 9/04; F01D 9/041; F01D 17/14; F01D 17/141; F01D 17/16; F01D 17/162; F05D 2240/122; F05D 2270/303; F05D 2250/90
See application file for complete search history.

(56) References Cited

U.S. PATENT DOCUMENTS

| 2,994,509 | A | 8/1961 | Walker |
| 3,563,669 | A | 2/1971 | Hockert |
| 4,312,486 | A | 1/1982 | McKinney |
| 4,968,216 | A | 11/1990 | Anderson |
| 5,517,817 | A | 5/1996 | Hines |
| 5,683,225 | A | 11/1997 | Orlando |

(Continued)

FOREIGN PATENT DOCUMENTS

| WO | WO2013/165512 A2 | 11/2013 |
| WO | WO2015/026597 A1 | 2/2015 |

OTHER PUBLICATIONS

Extended European Search Report and Opinion issued in connection with corresponding EP Application No. 17159245.4 dated Jul. 27, 2017.

*Primary Examiner* — Richard A Edgar
*Assistant Examiner* — Elton K Wong
(74) *Attorney, Agent, or Firm* — General Electric Company; Pamela Kachur

(57) ABSTRACT

The present disclosure is directed to a variable area turbine nozzle. The variable area turbine nozzle includes a first vane segment, a second vane segment arranged with the first vane segment, and a trailing edge segment arranged with the first and second vane segments. The vane also includes a first actuating system for pivoting the second vane segment with respect to the first vane segment and a second actuating system for pivoting the trailing edge with respect to the first and second vane segments.

20 Claims, 7 Drawing Sheets

(56) References Cited

U.S. PATENT DOCUMENTS

| | | | |
|---|---|---|---|
| 5,931,636 A * | 8/1999 | Savage | F01D 17/141 |
| | | | 415/115 |
| 6,139,268 A | 10/2000 | Murawski | |
| 6,419,464 B1 | 7/2002 | Arnold | |
| 8,007,229 B2 | 8/2011 | McCaffrey | |
| 8,172,508 B2 | 5/2012 | Mohamed | |
| 8,622,687 B2 | 1/2014 | Giffin | |
| 8,668,445 B2 | 3/2014 | Crespo | |
| 8,794,919 B2 | 8/2014 | Baek | |
| 8,943,796 B2 | 2/2015 | McCaffrey | |
| 9,091,174 B2 | 7/2015 | Bagnall | |
| 2002/0134070 A1 * | 9/2002 | Orlando | F01D 9/041 |
| | | | 60/204 |
| 2009/0067978 A1 | 3/2009 | Suljak | |
| 2009/0148282 A1 * | 6/2009 | McCaffrey | F01D 17/162 |
| | | | 415/208.2 |
| 2013/0223974 A1 * | 8/2013 | Schwarz | F01D 17/162 |
| | | | 415/1 |
| 2015/0210379 A1 | 7/2015 | Henning | |

* cited by examiner

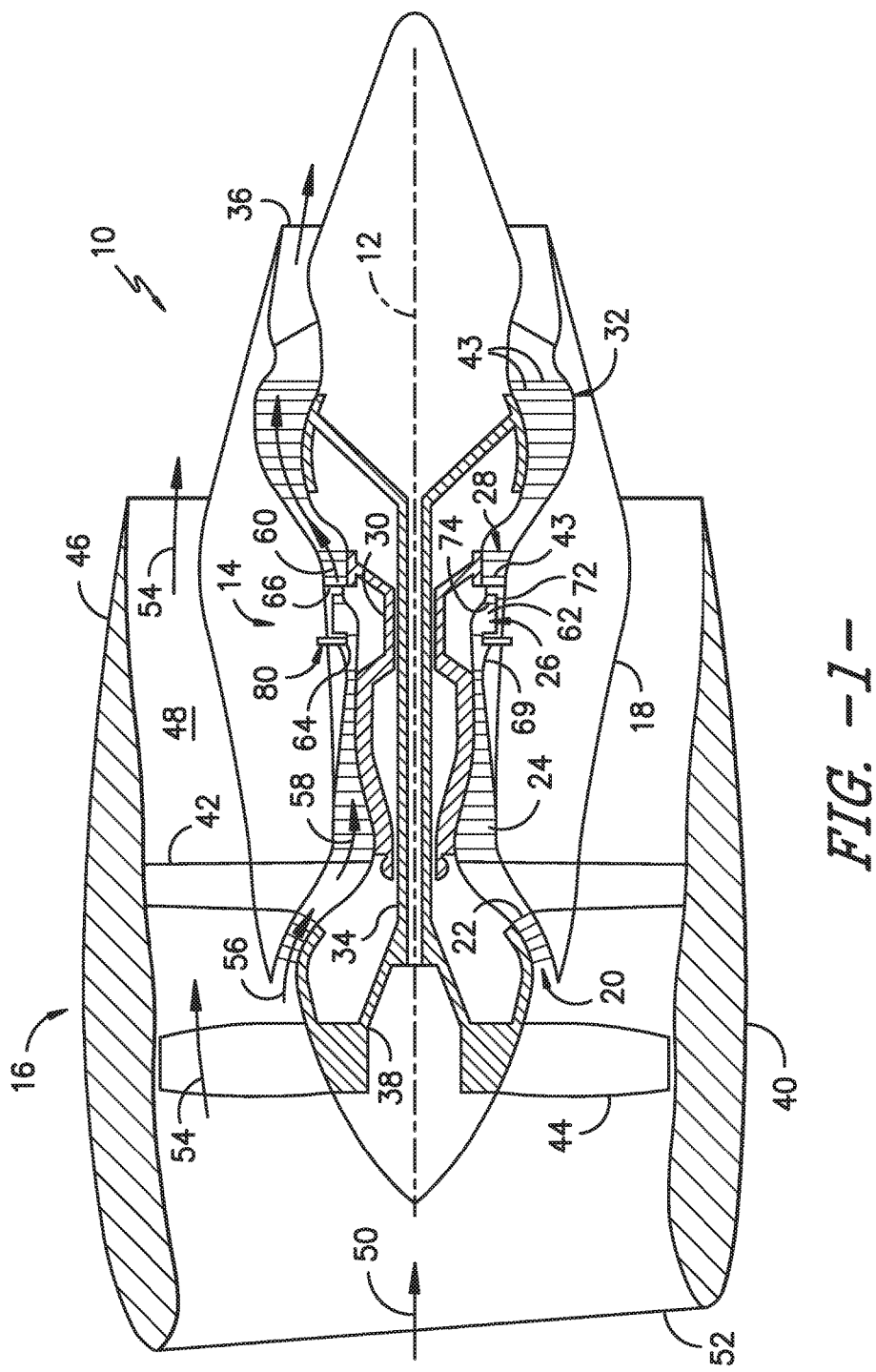
FIG. -1-

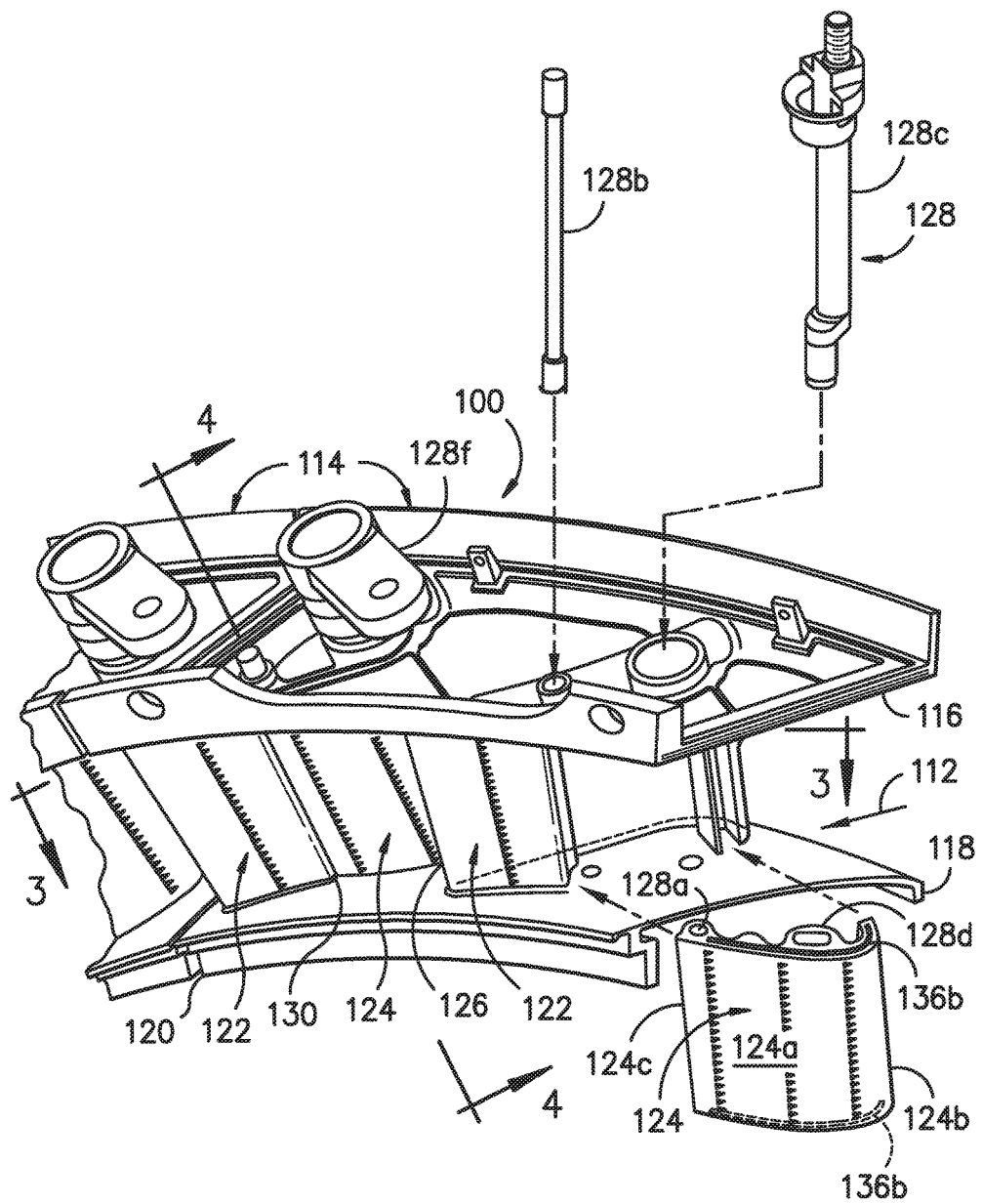
FIG. -2-

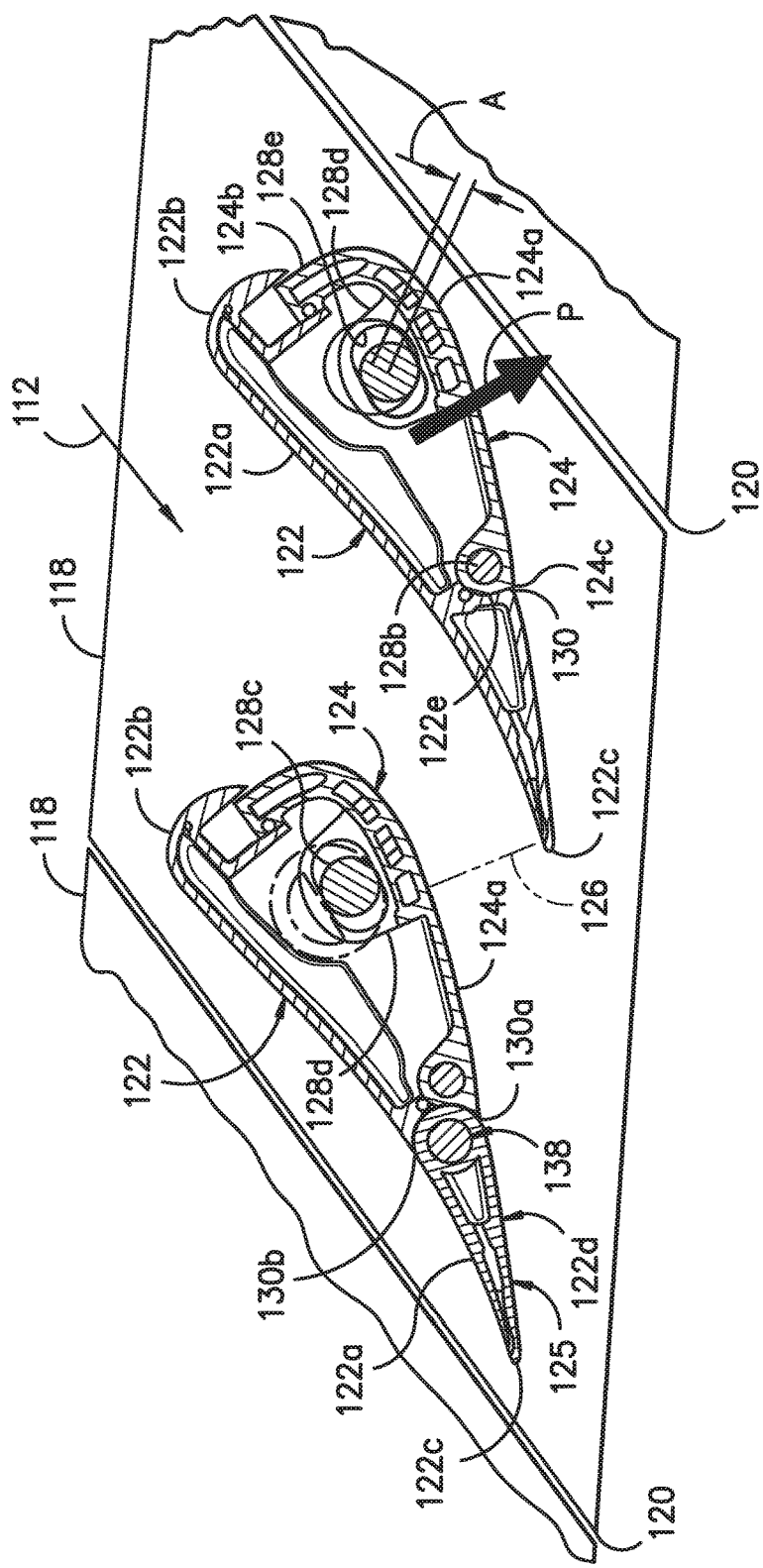
FIG. -3-

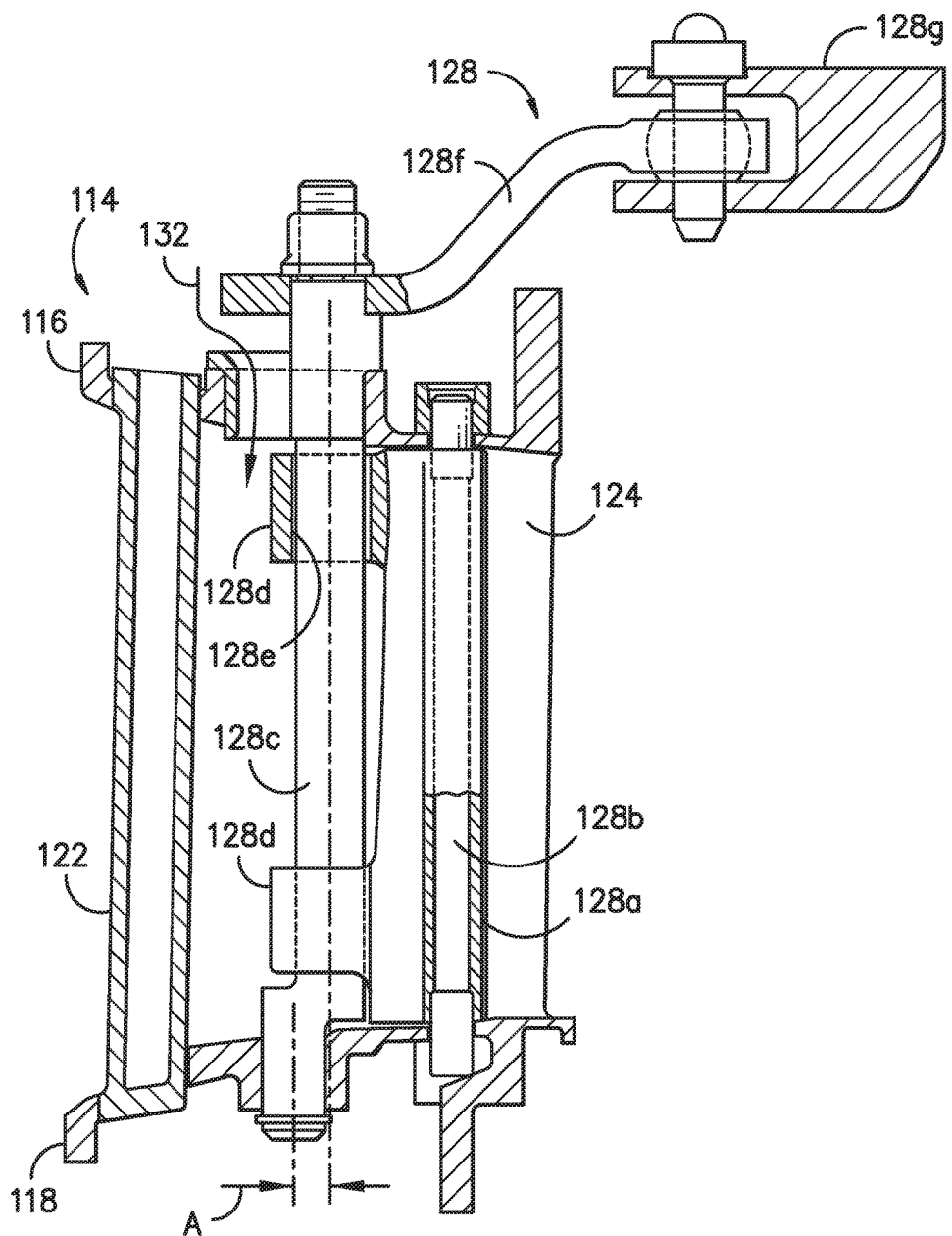
FIG. -4-

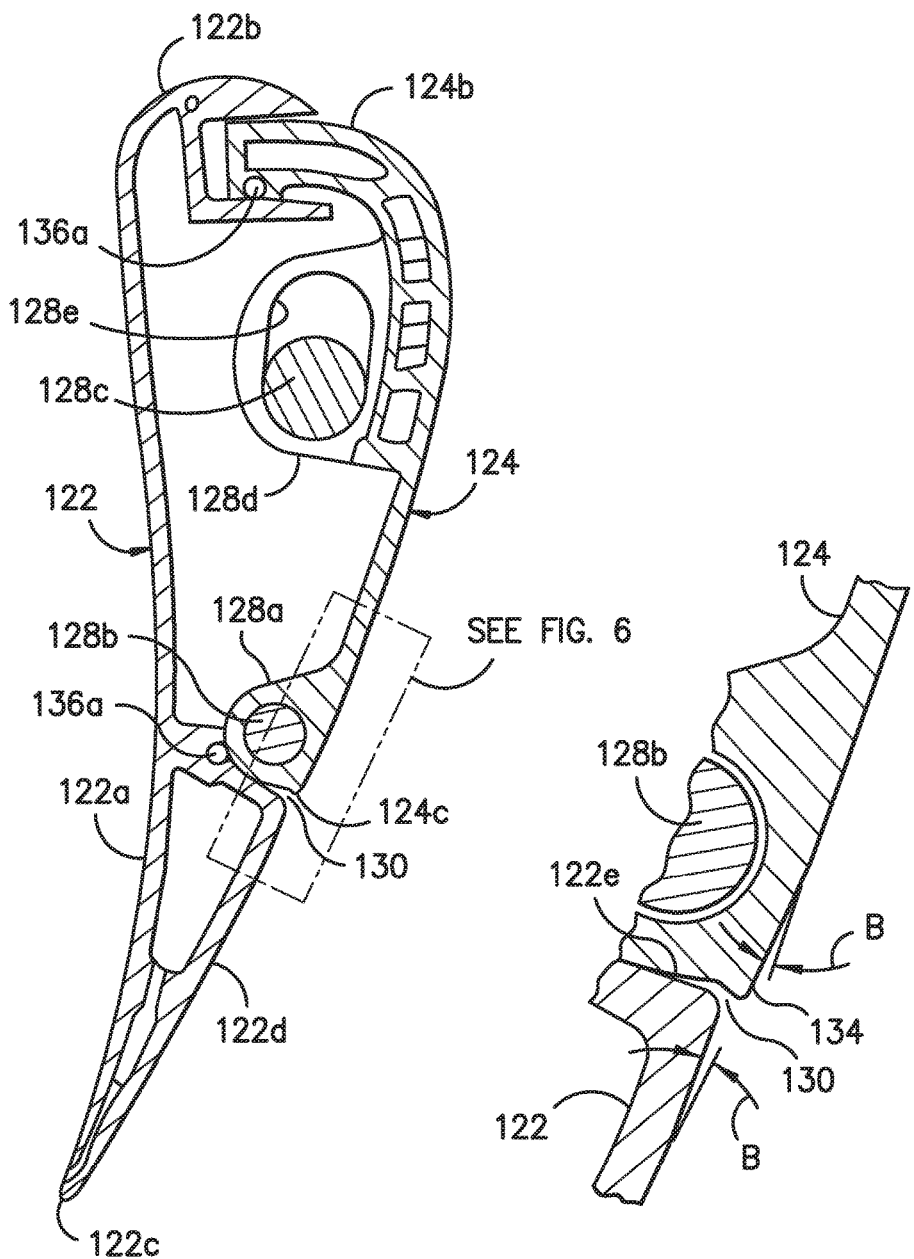

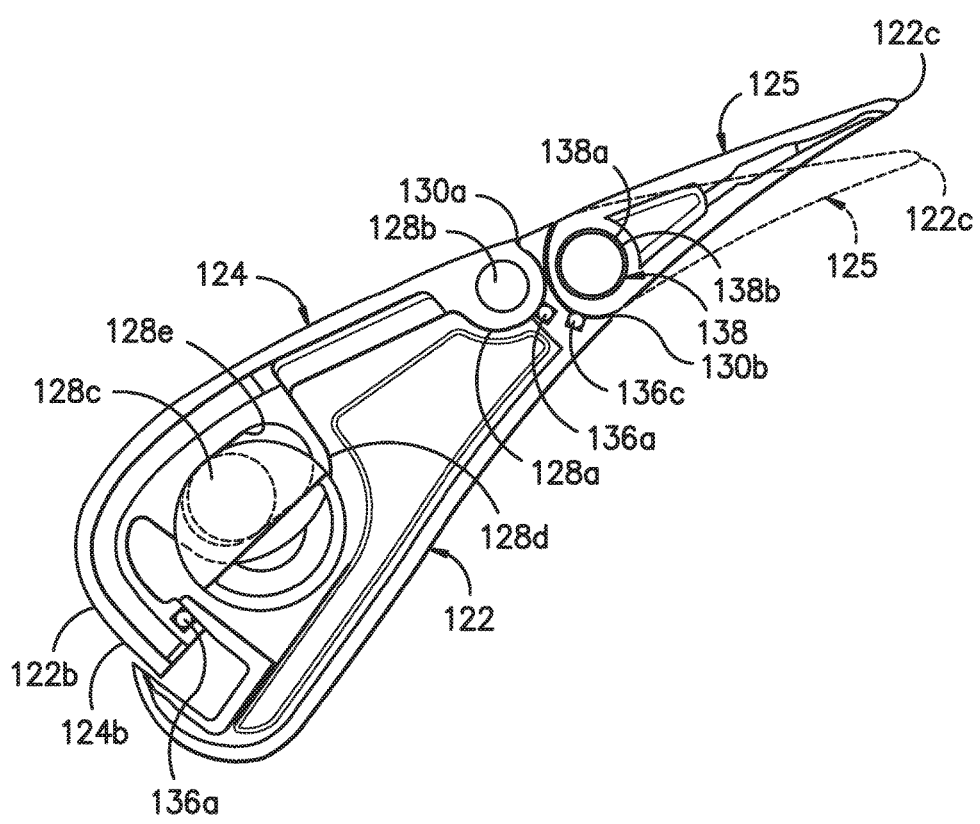
FIG. -7-

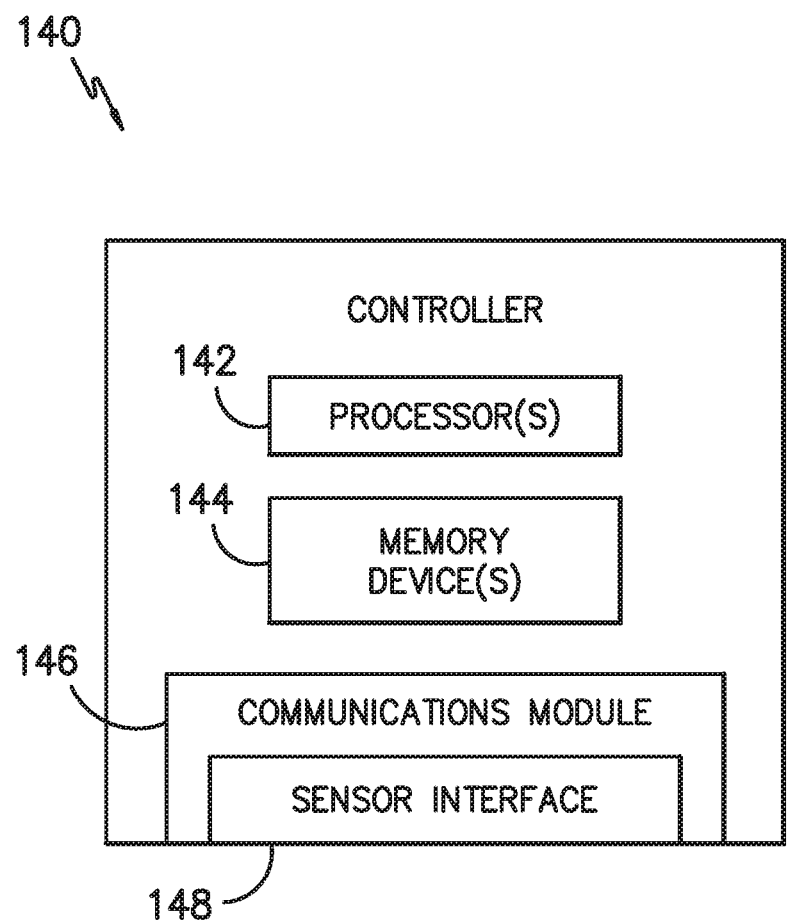
FIG. -8-

MODULATED HYBRID VARIABLE AREA TURBINE NOZZLE FOR GAS TURBINE ENGINE

FIELD OF THE INVENTION

The present subject matter relates generally to gas turbine engines, and more particularly, to modulated hybrid variable area turbine nozzles for gas turbine engines.

BACKGROUND OF THE INVENTION

A gas turbine engine generally includes, in serial flow order, a compressor section, a combustion section, a turbine section and an exhaust section. In operation, air enters an inlet of the compressor section where one or more axial or centrifugal compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as turbine rotor blades, rotor disks and retainers, and various stationary turbine components such as stator vanes or nozzles, turbine shrouds, and engine frames. The rotatable and stationary turbine components at least partially define the hot gas path through the turbine section. As the combustion gases flow through the hot gas path, energy is transferred from the combustion gases to the rotatable and stationary turbine components.

Typical turbine nozzles, such as high pressure and low pressure turbine nozzles, have fixed vane configurations and fixed nozzle throat areas therebetween in view of the severe temperature and high pressure loading environment in which they operate. The throat areas between adjacent nozzle vanes must be accurately maintained for maximizing performance of the engine, yet the hot thermal environment requires that the turbine nozzle be manufactured in circumferential segments for reducing thermal stress during operation. The nozzle segments therefore require suitable inter-segment sealing to reduce undesirable flow leakage, which further complicates turbine nozzle design.

Variable cycle engines are being developed for maximizing performance and efficiency over subsonic and supersonic flight conditions. Although it would be desirable to obtain variable flow through turbine nozzles by adjusting the throat areas thereof, previous attempts have proved impractical in view of the severe operating environment of the nozzles. For example, it is common to provide variability in compressor stator vanes by mounting each vane on a radial spindle and collectively rotating each row of compressor vanes using an annular unison ring attached to corresponding lever arms joined to each of the spindles. In this way, the entire compressor vane rotates or pivots about a radial axis, with suitable hub and tip clearances being required for permitting the vanes to pivot.

Applying the variable compressor configuration to a turbine nozzle has substantial disadvantages both in mechanical implementation as well as in aerodynamic performance. The severe temperature environment of the turbine nozzles being bathed in hot combustion gases from the combustor typically requires suitable cooling of the individual vanes, with corresponding large differential temperature gradients through the various components. A pivotable nozzle vane increases the difficulty of design, and also results in hub and tip gaps which require suitable sealing since any leakage of the combustion gas therethrough adversely affects engine performance and efficiency which negates the effectiveness of the variability being introduced.

Furthermore, nozzle vanes are subject to substantial aerodynamic loads from the combustion gas during operation, and in view of the airfoil configuration of the vanes, a substantial load imbalance results from the center-of-rotation of the individual vanes being offset from the aerodynamic center-of-pressure. This imbalance drives the required actuation torque loads upwardly and increases bending loads throughout the nozzle vanes to unacceptable levels.

Such adjustable nozzle vanes necessarily reduce the structural integrity and durability of the nozzle segments in view of the increased degree of freedom therebetween. And, angular pivoting of the individual nozzle vanes directly corresponds with the angular pivoting of the actuating lever arm joined thereto, which renders difficult the implementation of relatively small variations in throat area required for effective variable cycle operation.

Accordingly, it is desired to have a variable area turbine nozzle having improved construction and actuation for improving durability and performance of the gas turbine engine during operation.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a variable area turbine nozzle system having a variable area turbine nozzle and a controller. The variable area turbine nozzle includes at least one nozzle segment having outer and inner spaced apart bands and a plurality of vanes extending between the bands and spaced apart from each other to define a throat of minimum flow area for channeling therethrough combustion gas. Each of the vanes also includes a first vane segment fixedly joined to the bands and a second vane segment arranged with the first vane segment. Further, each of the vanes also includes a first actuating system for pivoting the second vane segments with respect to the first vane segments so as to vary the throat area. In addition, a subset of the vanes of the nozzle also include a trailing edge segment configured with the first and second vane segments and a second actuating system for pivoting the trailing edge with respect to the first and second vane segments. Thus, the controller is configured to control the first and second actuating systems.

In another aspect, the present disclosure is directed to a variable area turbine nozzle segment. The nozzle segment includes outer and inner spaced apart bands and a plurality of vanes spaced apart from each other to define a throat of minimum flow area for channeling therethrough combustion gas. Each of the vanes include a first vane segment extending between the bands and fixedly joined thereto and a second vane segment arranged with the first vane segment. Each vane also includes a first actuating system for pivoting the second vane segments with respect to the first vane segments so as to vary the throat area. Further, a subset of the vanes also include a trailing edge segment configured with the first and second vane segments and a second actuating system for pivoting the trailing edge with respect to the first and second vane segments. It should be understood that the variable area turbine nozzle segment may further include any of the additional features as described herein.

In yet another aspect, the present disclosure is directed to a variable area turbine nozzle, e.g. for a gas turbine engine. The variable area turbine nozzle includes a stationary first vane segment, a rotatable second vane segment arranged with the first vane segment, and a trailing edge segment configured with the first and second vane segments. The nozzle also includes a first actuating system for pivoting the second vane segment with respect to the first vane segment and a second actuating system for pivoting the trailing edge with respect to the first and second vane segments. It should be understood that the variable area turbine nozzle may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a schematic cross-sectional view of one embodiment of a gas turbine engine according to the present disclosure;

FIG. 2 illustrates a partly exploded, isometric view of a portion of an exemplary gas turbine engine turbine nozzle having variable area nozzle segments in accordance with an exemplary embodiment of the present invention;

FIG. 3 illustrates a top, sectional view of one of the exemplary nozzle segments illustrated in FIG. 2 and taken generally along line 3-3 for showing two adjoining nozzle vanes for effecting variable area throats therebetween;

FIG. 4 illustrates a partly sectional, elevational view through one of the variable area nozzle vanes illustrated in FIG. 2 and taken generally along line 4-4;

FIG. 5 illustrates an enlarged sectional view of one of the exemplary variable area nozzle vanes illustrated in FIG. 2;

FIG. 6 illustrates an enlarged sectional view of a hinge gap formed between stationary and movable segments of the nozzle vane illustrated in FIG. 5 within the circle labeled 6;

FIG. 7 illustrates an enlarged sectional view of another one of the exemplary variable area nozzle vanes illustrated in FIG. 2; and FIG. 8 illustrates a block diagram of one embodiment of various components that may be included in a controller according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

U.S. Pat. No. 5,931,636 entitled "Variable Area Turbine Nozzle," filed on Aug. 28, 1997 describes a variable area turbine nozzle having a plurality of circumferentially adjoining nozzle segments and is incorporated herein by reference in its entirety.

Generally, the present disclosure is directed to a variable area turbine nozzle and corresponding controller. The variable area turbine nozzle includes at least one nozzle segment having outer and inner spaced apart bands and a plurality of vanes spaced apart from each other to define a throat of minimum flow area for channeling combustion gas therethrough. Each of vanes includes, at least, a first vane segment extending between the bands and fixedly joined thereto and a second vane segment arranged with the first vane segment. The vanes also include a first actuating system for pivoting the second vane segment with respect to the first vane segment so as to vary the throat area. In addition, a subset of the vanes also includes a trailing edge segment configured with the first and second vane segments and a second actuating system for pivoting the trailing edge with respect to the first and second vane segments. Thus, the controller is configured to control the first and second actuating systems either individually or together.

The present disclosure provides various advantages not present in the prior art. For example, the turbine flow area variation can be modulated and customized through the use of two separate actuation systems. Thus, the present disclosure minimizes the penalty to turbine efficiency during both moderate and large variations in turbine flow area.

Referring now to the drawings, FIG. 1 illustrates a schematic cross-sectional view of one embodiment of a gas turbine engine 10 (high-bypass type) according to the present disclosure. More specifically, the gas turbine engine 10 may include an aircraft engine, e.g. for an airplane, helicopter, or similar. As shown, the gas turbine engine 10 has an axial longitudinal centerline axis 12 therethrough for reference purposes. Further, as shown, the gas turbine engine 10 preferably includes a core gas turbine engine generally identified by numeral 14 and a fan section 16 positioned upstream thereof. The core engine 14 typically includes a generally tubular outer casing 18 that defines an annular inlet 20. The outer casing 18 further encloses and supports a booster 22 for raising the pressure of the air that enters core engine 14 to a first pressure level. A high pressure, multi-stage, axial-flow compressor 24 receives pressurized air from the booster 22 and further increases the pressure of the air. The compressor 24 includes rotating blades and stationary vanes that have the function of directing and compressing air within the turbine engine 10. The pressurized air flows to a combustor 26, where fuel is injected into the pressurized air stream and ignited to raise the temperature and energy level of the pressurized air. The high energy combustion products flow from the combustor 26 to a first (high pressure) turbine 28 for driving the high pressure compressor 24 through a first (high pressure) drive shaft 30, and then to a second (low pressure) turbine 32 for driving the booster 22 and the fan section 16 through a second (low pressure) drive shaft 34 that is coaxial with the first drive shaft 30. Further, as shown, the first and second turbines 28, 32 each have a plurality of rotating blades and stationary vanes 43. After driving each of the turbines 28 and 32, the combustion products leave the core engine 14 through an exhaust nozzle 36 to provide at least a portion of the jet propulsive thrust of the engine 10.

The fan section 16 includes a rotatable, axial-flow fan rotor 38 that is surrounded by an annular fan casing 40. It will be appreciated that fan casing 40 is supported from the core engine 14 by a plurality of substantially radially-extending, circumferentially-spaced outlet guide vanes 42. In this way, the fan casing 40 encloses the fan rotor 38 and the fan rotor blades 44. The downstream section 46 of the fan casing 40 extends over an outer portion of the core engine 14 to define a secondary, or bypass, airflow conduit 48 that provides additional jet propulsive thrust.

From a flow standpoint, it will be appreciated that an initial airflow, represented by arrow 50, enters the gas turbine engine 10 through an inlet 52 formed by the fan casing 40. The airflow passes through the fan blades 44 and splits into a first air flow (represented by arrow 54) that moves through the conduit 48 and a second air flow (represented by arrow 56) which enters the booster 22.

The pressure of the second compressed airflow 56 is increased and enters the high pressure compressor 24, as represented by arrow 58. After mixing with fuel and being combusted in the combustor 26, the combustion products 60 exit the combustor 26 and flow through the first turbine 28. The combustion products 60 then flow through the second turbine 32 and exit the exhaust nozzle 36 to provide at least a portion of the thrust for the gas turbine engine 10.

Still referring to FIG. 1, the combustor 26 includes an annular combustion chamber 62 that is coaxial with the longitudinal centerline axis 12, as well as an inlet 64 and an outlet 66. As noted above, the combustor 26 receives an annular stream of pressurized air from a high pressure compressor discharge outlet 69. A portion of this compressor discharge air flows into a mixer (not shown). Fuel is injected from one or more fuel nozzles 80 to mix with the air and form a fuel-air mixture that is provided to the combustion chamber 62 for combustion. Ignition of the fuel-air mixture is accomplished by a suitable igniter, and the resulting combustion gases 60 flow in an axial direction toward and into an annular, first stage turbine nozzle 72. The turbine nozzle 72 is defined by an annular flow channel that includes a plurality of radially-extending, circumferentially-spaced nozzle vanes 74 that turn the gases so that they flow angularly and impinge upon the first stage turbine blades of the first turbine 28. As shown in FIG. 1, the first turbine 28 preferably rotates the high-pressure compressor 24 via the first drive shaft 30, whereas the low-pressure turbine 32 preferably drives the booster 22 and the fan rotor 38 via the second drive shaft 34.

Referring now to FIG. 2, a portion of an annular variable area turbine nozzle 100 configured as a high pressure turbine nozzle, e.g. for the first turbine 28 of FIG. 1, is illustrated. As shown, the nozzle 100 is configured for providing variable area to selectively control the flow of the combustion gas 112 from the combustor 26 to the rotor blades of the high pressure turbine 28. The variable area turbine nozzle 100 may also be referred to as a Controlled Area Turbine Nozzle (CATN).

In view of the severe temperature environment of the turbine nozzle 100 and the substantial aerodynamic and thermal loads accommodated thereby, the nozzle 100 is configured in a plurality of circumferentially adjoining nozzle segments 114 which collectively form a full, annular ring about the centerline axis 12 of the engine 10 (FIG. 1). Further, each nozzle segment 114 includes arcuate outer and inner bands 116, 118 radially spaced apart from each other. Circumferentially adjacent bands define splitlines 120 which thermally uncouple the adjacent nozzle segments 114 from each other, and require conventional sealing therebetween using spline seals for example.

In addition, as shown, each nozzle segment 114 preferably includes a plurality of circumferentially spaced apart first or stationary vane segments 122 extending radially, or longitudinally, between the outer and inner bands 116, 118, which are fixedly or integrally joined thereto. In the illustrated embodiment of FIG. 2, for example, two first vane segments 122 are joined to the common outer and inner bands 116, 118, and provide a rigid structural assembly for accommodating thermal and aerodynamic loads during operation while providing a stationary reference for accurately effecting preferred flow areas as described hereinbelow. For a portion of the vanes, a plurality of pivotable or second vane segments 124 circumferentially adjoin respective ones of the first vane segments 122 to define therewith corresponding two-segment vanes as shown in more particularity in FIGS. 3 and 5. In this exemplary embodiment, each of the first vane segments 122 is conventionally aerodynamically configured to define a concave or pressure sidewall 122a extending between a leading edge 122b and a trailing edge 122c.

Correspondingly, each of the second vane segments 124 is aerodynamically configured to define a portion of a convex or suction sidewall 124a extending between a first or forward end 124b and a second or aft end 124c spaced apart along the chord axis of the vanes. For example, as shown in FIG. 3 (referring particularly to the right nozzle), the second end 124c extends only part-chord between the leading and trailing edges 122b, 122c, with the sidewall 124a of the second vane segment 124 defining only a portion of the vane suction side. The remaining portion of the vane suction side is defined by a corresponding suction sidewall 122d of the first vane segment 122 extending from the trailing edge 122c.

In this way, the two first vane segments 122 between the leading and trailing edges 122b, 122c are fixedly joined in their entireties to both the outer and inner bands 116, 118 to create a four-piece rigid box structure to which the second vane segments 124 are suitably pivotally attached. This box structure provides structural rigidity for each nozzle segment 114 without any undesirable splitlines therein. The splitlines 120 are provided solely between the adjacent nozzle segments 114 in an otherwise conventional manner for accommodating differential thermal growth during operation. The mounting arrangement of the first vane segments 122 also provides an inherent seal along the entire pressure sidewall 122a between the leading and trailing edges 122b, 122c to prevent undesirable crossflow of the combustion gas past the individual vanes.

In additional embodiments, as shown in FIGS. 3 and 7, the vanes may also have a multi-segmented configuration having more than two segments. More specifically, as shown, the vanes may include the first vane segment 122, the second vane segment 124, and at least a third or trailing edge segment 125. Thus, in certain embodiments, a subset of the vanes may have a two-segment configuration (FIG. 3; right vane), whereas another subset of the vanes may have a three-segment or more configuration having at least the additional trailing edge segment 125 (FIG. 3; left vane) configured with the first and second vane segments 122, 124. In addition, as shown in FIG. 3, vanes with trailing edge segments 125 (left vane) may be mounted to the bands 116, 118 in an alternating, circumferential configuration with vanes without trailing edge segments (right vane). Thus, it should be understood that any suitable mounting pattern may be used such that at least two different variable area turbine nozzle geometries are arranged circumferentially in a predetermined pattern.

Further, as shown in FIG. 3, the vanes are circumferentially spaced apart from each other to define corresponding throats 126 of minimum flow area for channeling therethrough the combustion gas, which in turn is received by the turbine rotor blades which extract energy therefrom in a conventional manner. Each throat 126 is defined by the minimum distance between the trailing edge 122c of one vane and a corresponding location on the suction sidewall 124a of the adjacent vane.

Referring to FIGS. 3-4 and 7, each vane also includes a first actuating system 128 for pivoting each of the second vane segments 124 relative to its cooperating first vane segment 122 to selectively vary the individual throat areas 126 between the several vanes. Since the first vane segments 122 and the bands 116, 118 provide a rigid structure, the second vane segments 124 may be relatively simply mounted thereto for pivoting movement to provide controlled variable area capability. However, the individual second vane segments 124 must also be mounted to accommodate the substantial thermal and aerodynamic loads during operation without undesirable distortion which could adversely affect their movement, and without adversely affecting accurate control of the throat areas 126. In addition, as shown in FIGS. 3 and 7, the subset of vanes having an additional trailing edge segment 125 may also include a second actuating system 138 for pivoting the trailing edge segment 125 with respect to the first and second vane segments 122, 124.

In one embodiment, as shown in FIGS. 2-3, 5, and 7, the first actuating system 128 may include two hinge joints and two actuation joints joining together respective pairs of the first and second vane segments 122, 124. More specifically, as shown in FIGS. 2 and 3, the first actuating system 128 preferably include a corresponding hinge tube 128a integrally or fixedly joined to respective ones of the second vane segments 124 on the inside thereof at the aft end 124c, and defines a radial or longitudinal hinge gap 130a with a complementary hinge seat 122e integrally formed in the first vane segment 122. A corresponding elongate hinge pin 128b extends radially through corresponding apertures in the outer and inner bands 116, 118 and respective ones of the hinge tubes 128a to pivotally mount each of the second vane segments 124 to the respective first vane segments 122 for pivoting movement relative thereto in the manner of a swinging door. A respective actuation cam shaft 128c extends radially through corresponding apertures in the outer and inner bands 116, 118, and is operatively joined to respective ones of the second vane segments 124 to pivotally adjust the second vane segments to vary the throat area 126.

The cam shaft 128c may take various configurations to cooperate with the inside of the corresponding second vane segments 124 for pivoting thereof. For example, as shown particularly in FIG. 4, each of the second vane segments 124 preferably includes a pair of longitudinally or radially spaced apart cam lugs 128d integrally or fixedly joined to the inside thereof. As shown more clearly in FIG. 3, each of the lugs 128d includes an oval slot 128e.

Correspondingly, the cam shaft 128c includes a radially offset cylindrical cam or lobe extending through the two lug slots 128e in a close lateral fit for pivoting the second vane segments 124 between expanded and contracted positions to correspondingly reduce and increase flow area of the throats 126 upon rotation of the cam shaft 128c. For example, FIG. 3 illustrates the second vane segments 124 pivoted to their maximum expanded or open position which in turn minimizes or closes flow area of the throat 126. As shown in FIG. 5, the second vane segment 124 is pivoted to its contracted or closed position to maximize or open the flow area of the throat 126.

FIGS. 2 and 4 illustrate one embodiment of the cam shaft 128c is illustrated. As shown, the intermediate portion of the cam shaft 128c defines a cylindrical cam lobe which engages the lugs 128d, with the outer and inner ends of the cam shaft 128c having suitable jogs terminating at bushings having a radial offset A. The bushings engage complementary apertures in the outer and inner bands for rotating about a radial axis of rotation, with the centerline axis of the cam being offset at the radius A therefrom. The outer end of the cam shaft 128c is suitably joined to a conventional lever 128f, which in turn is pivotally joined to an annular unison ring 128g in a manner similar to the actuation of conventional compressor stator vanes. Suitable actuators (not shown) rotate the unison ring 128g about the centerline axis of the engine to in-turn rotate the levers 128f which rotate the respective cam shafts 128c. The offset A of the cam shaft 128c as illustrated in FIGS. 3 and 4 causes relative movement laterally between the opposing first and second vane segments 122, 124 to effect relative expansion and contraction therebetween.

Referring to FIG. 3, the cam shaft 128c may be rotated through its maximum lateral displacement from the first vane segment 122 to position the second vane segment 124 at its maximum expanded position to modify the minimum throat area. Further, as shown, the lug oval slots 128e have parallel flat sidewalls defining a minor axis of minimum length therebetween, and semicircular opposite sidewalls define therebetween a major axis of maximum length. The minor axis is preferably disposed substantially parallel to the plane of the adjacent throat 126, with the major axis being generally parallel to the chord line extending between the leading and trailing edges 122b, 122c of the first vane segment 122 at the maximum expanded position. In the maximum expanded position illustrated in FIG. 3, the cam shaft 128c may be rotated a full 90° clockwise, for example, for contracting the second vane segment 124.

A significant benefit of this arrangement is the mechanical advantage provided by the cam shaft 128c, and the very fine angular adjustment capability therewith. For example, 90° rotation of the cam shaft between the expanded and contracted positions of the second vane segments 124 may correspond with only about 9° rotation of the second vane segments 124 about the hinge pins 128b. In the initial travel from the maximum expanded position, substantially less than 0.5° of rotation of the second vane segments 124 can be obtained with up to about 20° of rotation of the cam shaft 128c, with a corresponding reduction ratio greater than about 40 times. At the opposite end of travel when the second vane segments 124 are in their fully contracted position corresponding with 90° rotation of the cam shaft, a total of about 9° rotation of the second vane segment 124 is effected which corresponds with a reduction ratio of ten times.

Accordingly, extremely fine adjustment of the flow area of the throats 126 may be obtained near the maximum expanded positions of the second vane segments 124 for correspondingly accurately adjusting the variable cycle of the engine 10. Suitably fine adjustment is also provided when the second vane segments 124 are in their maximum contracted position as well.

For ease of assembly and disassembly, the size of the oval slot 128e is selected to complement the profile of the cam shaft 128c so that the cam shaft 128c may be readily inserted radially inwardly through the outer band 16, the two lugs 128d, and inserted into the inner band 118. The inner bushing of the cam shaft 128c is preferably smaller than the outer bushing for allowing this ease of assembly. For disassembly, the cam shaft 128c may simply be withdrawn in the reverse, radially outward direction. Correspondingly, the relatively simple hinge pin 128b is similarly simply inserted radially inwardly through the outer band 16, the hinge tube 128a, and into the inner band 118. This configuration allows assembly and disassembly of these three components for servicing or replacing any one thereof during a maintenance outage.

Referring to FIGS. 3 and 7, the second actuating system 138 may be disposed adjacent to at least one of the hinge joints (e.g. hinge pin 128b) of the first actuating system 128. Further, the second actuating system 138 may be similarly configured having any of the components of the first actuating system 128. For example, in one embodiment, the second actuating system 138 may include a hinge tube 138a fixedly joined to the first and second vane segments 122, 124 and the trailing edge segment 125 at one end thereof with a hinge pin 138b extending through the bands 116, 118 and respective ones of the hinge tubes 138a to mount the trailing edge segment 125 to the first and second vane segments 122, 124 for pivoting movement thereof. In still additional embodiments, the second actuating system 138 may include any suitable actuators configured to move the trailing edge segment 125 with respect to the first and second vane segments 122, 124.

Since the nozzle segments 114 as described herein channel hot combustion gas therethrough during operation, the vane segments 122, 124, 125 may be suitably cooled using any conventional cooling technique including film and impingement cooling for example. In vane cooling, a portion of pressurized air 132 (FIG. 4) is suitably bled from the compressor (not shown) and channeled to the nozzle segments 114. The sidewalls of the nozzle segments 122, 124, 125 may be of a suitable double-wall construction for channeling the pressurized air 132 therebetween for effecting suitable cooling thereof.

Further, as shown in FIG. 4, the top bushing of the cam shaft 128c may include an aperture therethrough through which a portion of the pressurized air 132 may be channeled inside the hollow segmented vane for internal cooling thereof. The pressure of the air 132 is substantially greater than the pressure of the combustion gas 112 which differential pressure is useful for self-deploying the second vane segments 124 into their maximum expanded positions. The cam shafts 128c restrain deployment of the second vane segments 124 against the differential pressure force until the cam shafts 128c are rotated. Rotation of the cam shafts 128c allows the second vane segments 124 to pivot outwardly from the first vane segments 122, with the cam shafts 128c also providing a mechanical force for actuation if required against any inherent frictional restraining forces occurring during operation.

Since the vane segments 122, 124, 125 are relatively thin-walled members, they are subject to differential thermal and pressure loads during operation. Accordingly, the two lugs 128d illustrated in FIG. 4 are preferably spaced apart radially at opposite hub and tip ends of the second vane segments 124 to maximize the distance therebetween, and to maximize the reaction constraint on the second vane segments 124 at their hubs and tips. Since the second vane segments 124 define portions of the suction side of the individual vanes, they are highly loaded aerodynamically during operation and are restrained from outward deflection at the hub and tip by the respective lugs 128d which in turn transfer loads to the cam shaft 128c. Thus, the vane arrangements of the present disclosure enhance flow area control without over-constraining the suction sidewall which could cause excessive thermal stress.

Correspondingly, the hinge pin 128b (FIGS. 2 and 4) preferably has a reduced diameter center section between the maximum diameter outer and inner ends thereof. In this way, the hinge tube 128a illustrated in FIG. 4 is constrained at the hinge pin 128b solely at the outer and inner portions thereof. This again constrains outward deflection of the second vane segments 24 at their hubs and tips against the substantial pressure loads applied thereacross. The reduced center section of the hinge pin 128b reduces the likelihood of frictional binding with the hinge tube 128a due to pressure and thermal distortion during operation. In this way, each of the second vane segments 124 is joined to its complementary first vane segment 122 at four points, solely at the hubs and tips thereof corresponding with the lug and cam joints and the hinge tube and pin joints.

As shown in FIG. 3, the lugs 128d are preferably disposed on the second vane segments 124 adjacent to the throats 126 as space permits to effect a nodal point of minimum differential displacement due to thermal or pressure loading. Since the second vane segments 124 are effectively mounted solely at four reaction points, these segments are subject to distortion and displacement due to thermal gradients and differential pressure. Such displacement can adversely affect the accuracy of the flow area at the throats 126. By placing the lugs 128d and corresponding cam shaft 128c closely adjacent the throat 126, a node of little or no relative displacement will be created, with relative displacement instead being effected away from the throat 26. And, the lugs 128d are also preferably disposed close to the center-of-pressure P of the vane to reduce bending distortion. The area of the throat 126 may therefore be more accurately maintained during operation.

Referring still to FIG. 3, the suction sidewall adjacent the hinge gap 130a should be relatively coextensive for maintaining an aerodynamically smooth contour for maximizing nozzle vane aerodynamic efficiency. However, when the second vane segments 124 are pivoted to their maximum contracted position as illustrated in FIG. 5, the hinge gap 130a necessarily increases at the suction sidewall, which experiences a small bend or kink corresponding with the maximum angular travel of the second vane segment 124, which is about 9° in the exemplary embodiment. In order to improve aerodynamic performance when the second vane segments 124 are disposed in the maximum contracted position (FIGS. 5 and 6), both the first and second vane segments 122, 124 at the hinge gap 130a include suitable chamfers 134 to reduce step discontinuity at the hinge gap 130a for reducing aerodynamic flow disruption with the second vane segments 124 in the contracted position. The chamfers 134 have a small acute angle B relative to the nominal surface of the suction sidewall, which angle B is about 4.5°, or half the maximum angular travel, in the exemplary embodiment.

As indicated above with reference to FIG. 4, suitable means are provided for channeling the pressurized air 132 into the individual vanes defined by the complementary vane segments 122, 124, 125 for cooling thereof. Accordingly, one or more seals 136*a*, 136*b*, 136*c* may be also required for sealing various areas of the vane. For example, as shown in FIG. 2, a seal 136*b* is provided between the second vane segments 124 and the outer and inner bands 116, 118. More specifically, as shown, suitable end seals 136*b* in the exemplary form of spline seals may be mounted in corresponding recesses in the hub and tip of the second vane segments 124 for engaging complementary surfaces of the outer and inner bands 116, 118 to effect sealing therebetween. Further, as shown in FIG. 5, a seal 136*a* is provided at the first vane segments 122 to confine the pressurized air inside the vanes upon pivoting travel of the second vane segments 124. For example, as shown in FIG. 5, suitable wire seals 136*a* are preferably disposed in complementary semicircular seats to seal the hinge gap 130*a* radially along the hinge tube 128*a* at the aft end of the second vane segments 124 and to seal a similar gap at the forward end thereof. Further, as shown, the forward end 124*b* of the second vane segment 124 may internally overlap a complementary portion of the first vane segment 122 at the leading edge 122*b* for accommodating the required expansion and contraction travel relative thereto. In such an embodiment, a corresponding wire seal 136*a* may be disposed at any suitable location for sealing the overlapping joint between the first and second vane segments 122, 124 at the leading edge. Further, as shown in FIG. 7, a seal 136*c* may be provided at the hinge gaps of the second actuating system 138 to confine the pressurized air inside the vanes upon pivoting travel of the trailing edge segment 125.

Referring now to FIG. 8, the first and second actuating systems 128, 138 of the vanes may be controlled by a controller 140. More specifically, in one embodiment, the controller 140 may be configured to individually or separately control the first and second actuating systems 128, 138. Alternatively, the controller 140 may be configured to control the first and second actuating systems 128, 138 together, e.g. based on a predetermined schedule. In further embodiments, the controller 140 may be further configured to control the first and second actuating systems 128, 138 as a function of a predetermined temperature range, e.g. of the combustion gases 112. Thus, as shown in FIG. 8, a block diagram of one embodiment of suitable components that may be included in the controller 140 according to the present disclosure is illustrated. As shown, the controller 140 may include one or more processor(s) 142 and associated memory device(s) 144 configured to perform a variety of computer-implemented functions (e.g., performing the methods, steps, calculations and the like and storing relevant data as disclosed herein). Additionally, the controller 140 may also include a communications module 146 to facilitate communications between the controller 140 and the first and second actuating systems 128, 138. Further, the communications module 146 may include a sensor interface 148 (e.g., one or more analog-to-digital converters) to permit signals transmitted from one or more sensors (e.g. temperature sensors) to be converted into signals that can be understood and processed by the processor(s) 142. It should be appreciated that such sensors may be communicatively coupled to the communications module 146 using any suitable means. For example, the sensors may be coupled to the sensor interface 148 via a wired connection. However, in other embodiments, the sensors may be coupled to the sensor interface 148 via a wireless connection, such as by using any suitable wireless communications protocol known in the art. As such, the processor(s) 142 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 144 may generally include memory element(s) including, but not limited to, computer readable medium (e.g., random access memory (RAM)), computer readable non-volatile medium (e.g., a flash memory), cloud storage, a floppy disk, a compact disc-read only memory (CD-ROM), a magneto-optical disk (MOD), a digital versatile disc (DVD) and/or other suitable memory elements. Such memory device(s) 144 may generally be configured to store suitable computer-readable instructions that, when implemented by the processor(s) 142, configure the controller 140 to perform various functions of the gas turbine engine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A variable area turbine nozzle system, comprising:
   a variable area turbine nozzle comprising at least one nozzle segment, the nozzle segment comprising:
   outer and inner spaced apart bands,
   a plurality of vanes spaced apart from each other to define a throat of minimum flow area for channeling therethrough combustion gas, each of the plurality of vanes comprising:
   a first vane segment extending between the bands and fixedly joined thereto,
   a second vane segment arranged with the first vane segment, and
   a first actuating system for pivoting the second vane segment with respect to the first vane segment so as to vary the throat area;
   wherein a subset of the plurality of vanes also comprise:
   a trailing edge segment configured with the first and second vane segments, and
   a second actuating system for pivoting the trailing edge segment with respect to the first and second vane segments, the second actuating system positioned adjacent to the first actuating system, the second actuating system fixedly joined to the first and second vane segments and the trailing edge segment at one end thereof so as to mount the trailing edge segment to the first and second vane segments for pivoting movement thereof; and
   a controller configured to control the first and second actuating systems.

2. The nozzle system of claim 1, wherein vanes having trailing edge segments are mounted to the bands in a predefined alternating, circumferential configuration with vanes without trailing edge segments.

3. The nozzle system of claim 1, wherein the controller is configured to individually control the first and second actuating systems.

4. The nozzle system of claim 1, wherein the controller is configured to control the first and second actuating systems together based on a predetermined schedule.

5. The nozzle system of claim 1, wherein the controller is further configured to control the first and second actuating systems as a function of a predetermined temperature range.

6. The nozzle system of claim 1, wherein the first actuating system comprises two hinge joints and two actuation joints joining together respective pairs of the first and second vane segments.

7. The nozzle system of claim 6, wherein the actuation joints are disposed adjacent the throats.

8. The nozzle system of claim 6, wherein the first actuating system further comprises:
 a hinge tube fixedly joined to respective ones of the second vane segments at one end thereof to define a hinge gap with a complementary seat of the first vane segments;
 a hinge pin extending through the bands and respective ones of the hinge tubes to mount the second vane segments to the first vane segments for pivoting movement; and
 a respective cam shaft extending through the two actuation joints of each of the vanes, the cam shaft being rotatable to pivot the second vane segment about the hinge joints.

9. The nozzle system of claim 8, wherein the second actuating system is disposed adjacent at least one of the hinge joints.

10. The nozzle system of claim 1, wherein the second actuating system comprises:
 a hinge tube fixedly joined to respective ones of the first and second vane segments at one end thereof; and
 a hinge pin extending through the bands and respective ones of the hinge tubes to mount the trailing edge segments to the first and second vane segments for pivoting movement.

11. A variable area turbine nozzle segment, comprising:
 outer and inner spaced apart bands;
 a plurality of vanes spaced apart from each other to define a throat of minimum flow area for channeling therethrough combustion gas, each of the plurality of vanes comprising:
  a first vane segment extending between the bands and fixedly joined thereto,
  a second vane segment arranged with the first vane segment, and
  a first actuating system for pivoting the second vane segment with respect to the first vane segment so as to vary the throat area, wherein a subset of the plurality of vanes also comprise:
  a trailing edge segment configured with the first and second vane segments, and
  a second actuating system for pivoting the trailing edge segment with respect to the first and second vane segments, the second actuating system positioned adjacent to the first actuating system, the second actuating system fixedly joined to the first and second vane segments and the trailing edge segment at one end thereof so as to mount the trailing edge segment to the first and second vane segments for pivoting movement thereof.

12. The nozzle segment of claim 11, wherein vanes having trailing edge segments are mounted to the bands in a predefined alternating, circumferential configuration with vanes without trailing edge segments.

13. The nozzle segment of claim 11, wherein the first actuating system further comprises:
 a hinge tube fixedly joined to respective ones of the second vane segments at one end thereof to define a hinge gap with a complementary seat of the first vane segments;
 a hinge pin extending through the bands and respective ones of the hinge tubes to mount the second vane segments to the first vane segments for pivoting movement; and
 a respective cam shaft extending through two actuation joints of each of the vanes, the cam shaft being rotatable to pivot the second vane segment about two hinge joints.

14. The nozzle segment of claim 13, wherein the second actuating system is disposed adjacent at least one of the hinge joints.

15. The nozzle segment of claim 11, wherein the second actuating system comprises:
 a hinge tube fixedly joined to respective ones of the first and second vane segments at one end thereof; and
 a hinge pin extending through the bands and respective ones of the hinge tubes to mount the trailing edge segments to the first and second vane segments for pivoting movement.

16. A variable area turbine nozzle, comprising:
 a stationary first vane segment;
 a rotatable second vane segment arranged with the first vane segment to define a corresponding vane;
 a rotatable trailing edge segment configured with the first and second vane segments;
 a first actuating system for pivoting the second vane segment with respect to the first vane segment; and,
 a second actuating system for pivoting the trailing edge segment with respect to the first and second vane segments, the second actuating system positioned adjacent to the first actuating system, the second actuating system fixedly joined to the first and second vane segments and the trailing edge segment at one end thereof so as to mount the trailing edge segment to the first and second vane segments for pivoting movement thereof.

17. The variable area turbine nozzle of claim 16, wherein the first actuating system includes two hinge joints and two actuation joints joining together respective pairs of the first and second vane segments.

18. The variable area turbine nozzle of claim 17, wherein the first actuating system further comprises:
 a hinge tube fixedly joined to respective ones of the second vane segments at one end thereof to define a hinge gap with a complementary seat of the first vane segments;
 a hinge pin extending through the bands and respective ones of the hinge tubes to mount the second vane segments to the first vane segments for pivoting movement; and
 a respective cam shaft extending through the two actuation joints of each of the vanes, the cam shaft being rotatable to pivot the second vane segment about the two hinge joints.

19. The variable area turbine nozzle of claim 16, wherein the second actuating system is disposed adjacent at least one of the hinge joints.

20. The variable area turbine nozzle of claim 16, wherein the second actuating system comprises:
- a hinge tube fixedly joined to respective ones of the first and second vane segments at one end thereof, and
- a hinge pin extending through the bands and respective ones of the hinge tubes to mount the trailing edge segments to the first and second vane segments for pivoting movement.

* * * * *